Sept. 30, 1952 J. FOOTER 2,612,177
DENTAL FLOSS
Filed Aug. 9, 1950
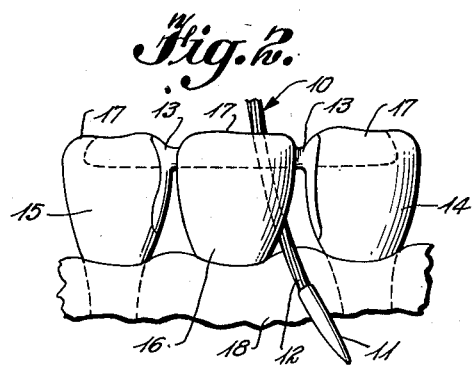
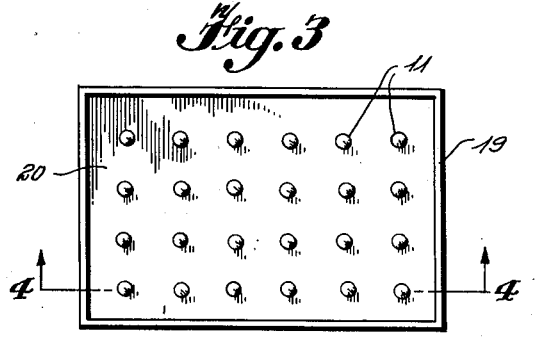
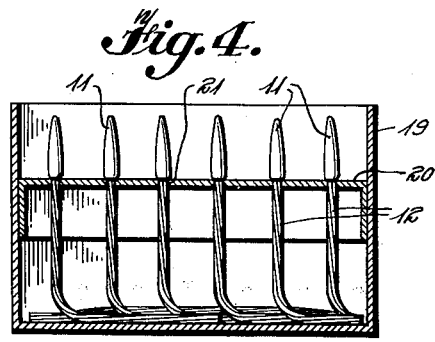
INVENTOR
*Jerome Footer*
BY *Stevens, Davis, Miller & Mosher*
ATTORNEYS Patented Sept. 30, 1952

2,612,177

UNITED STATES PATENT OFFICE 2,612,177

DENTAL FLOSS

Jerome Footer, Washington, D. C.

Application August 9, 1950, Serial No. 178,405

1 Claim. (Cl. 132—93)

This invention relates to an improvement in dental floss and more particularly to dental floss which is easily and readily insertable between teeth.

Heretofore difficulty has been encountered in the proper cleaning of those teeth which form a part of a permanent dental bridge or other like tooth structure. As is well understood, the proper cleaning of teeth is best effected by means of a threadlike material known as dental floss. This material is soft and very flexible so that during use injury to gums and teeth will not result. Because of the special properties possessed by this material it can only be used by insertion in the space between the occlusal surfaces of adjacent teeth and worked toward the gum and past the point of contact between the two teeth by a back and forth sawing motion. Once the dental floss has passed the point of contact it can then be utilized to clean the space defined by the complementary mesial and distal surfaces of the adjacent teeth and the gum. In addition to manipulating the dental floss in the above manner, it is also possible to further work it to clean the lingual and baccal or labial surfaces of the teeth.

However, in the cleaning of a permanent dental bridge wherein one or more artificial crowns are secured where teeth are missing by anchorage to natural teeth, the occlusal surfaces of the teeth integral with the bridgework are bonded together and form a continuous surface from one end of the bridge to the other. As a result thereof it is impossible to work a length of dental floss between two adjacent teeth in the conventional manner.

It is an object of this invention to provide an improved dental floss wherein it may be utilized to effectively clean teeth and is particularly adapted to clean teeth which form part of a permanent dental bridge.

It is another object of this invention to provide an improved dental floss which will efficiently clean all types of tooth structure natural or artificial and which will permit the dental floss to be properly positioned to begin the cleaning operation without danger of injury to the gum or artificial tooth structure.

Other objects and advantages of the present invention will become apparent from a study of the following specification when considered in conjunction with the drawings, in which:

Figure 1 is a view in side elevation of a length of the improved dental floss;

Figure 2 is a view in side elevation of a permanent dental bridge showing how the improved dental floss effects the cleaning;

Figure 3 is a view in plan showing a packaging arrangement for the improved dental floss; and Figure 4 is a view in section along line 4—4 of Figure 3.

Referring now to the drawing in detail, Figure 1 illustrates the improved dental floss which is designated as 10. As shown herein, a length of conventional threadlike material 12 commonly used for dental cleaning is provided at one end with a blunt tip 11. This tip has a maximum diameter of slightly more than the diameter of the material 12 and while the tip is referred to as blunt it is nevertheless to be understood that the tip is pointed, though not sharply, in order that it may function properly. The term blunt merely signifies that the tip is of such a construction that injury will not result to the teeth or gums by its use. By utilizing such an arrangement with a blunt tip the dental floss is given a certain amount of body to enable it to pass into small spaces.

The tip 11 can be formed from any of the known plastic materials which would be suitable for use orally. However, it is preferred that the plastic be one of the group of synthetic resins of the thermoplastic type. Among these resins there are vinyl resins, which consist of polymers of vinyl acetate, vinyl chloride, and to a lesser extent vinyl chloroacetate, polystyrene and polyacrylates.

The improved dental floss 10 is made by coating or impregnating one end of a length of the cleaning material 12 by means of any known process with one of the synthetic resins of the thermoplastic type aforementioned. However, it is preferred that the dental floss be treated in the following manner. The resin selected is placed in a bath of vinyl chloride polymer and heated until it reaches a workable degree of consistency for the ensuing operations. Several lengths of dental floss are then positioned in proximity to the bath and moved so as to place the ends of the materials 12 desired to be treated into the bath. They are subsequently removed after this dipping operation and put in a suitable place to cool and dry so that the tips will harden.

The manner in which the improved dental floss 10 is effectively used to clean artificial tooth structures is shown in Figure 2. It will be noted that the permanent dental bridge 13 as illustrated has integral therewith two natural teeth 14 and 15 to which is anchored an artificial crown 16. As may be readily seen it is impossible to work a length of dental floss between two adjacent elements of the dental bridge in the usual manner inasmuch as the occlusal surfaces 17 of the teeth are bonded together by the bridge. However, by utilizing the improved dental floss of the present invention it is possible to effectively clean the teeth by passing the dental floss 10 between natural tooth 14 and artificial crown 16 by means of the blunt tip 11. It then can be manipulated in the space defined by these two teeth in conjunction with the gum 18 to remove all foreign matter harmful or injurious to the teeth or gum.

While this invention has been described as being specifically useful in the proper cleaning of permanent dental bridges, it nevertheless does possess certain beneficial properties which result from its use in other situations. For example, it is well known that persons inexperienced in the use of dental floss have a tendency to injure themselves while placing the dental floss in the position. This is due primarily to the fact that a great pressure is required to force the dental floss past the point of contact of two adjacent teeth. In this case if the dental floss is not in extremely skilled hands, the user may cause injury to his gum.

By utilizing the dental floss of the present invention this danger instantly ceases since no great pressures are present and the dental floss may be easily and readily slipped between the teeth.

In Figures 3 and 4 is shown an arrangement whereby the improved dental floss may be packaged. A rectangular box 19 is provided having therein a false floor 20 containing a series of holes 21 through which the material 12 will pass while the blunt tip 11 will not. By so positioning the dental floss with their blunt tips showing a neat packaging arrangement is presented. It is also efficient in that it is very easy to remove a length of dental floss when it is so desired by simply grasping the protruding tip 11 of a length of floss and pulling it free from the package by drawing the threadlike material 12 through the hole 21 in the false floor 20.

What has been described heretofore is a specific embodiment of the present invention. Other and further embodiments, as well as various modifications obvious from this description to one skilled in the art, are within the contemplation and spirit of this invention.

What is claimed is:

An element for oral use that comprises a length of dental cleaning floss, one end of said dental floss being impregnated with a thermoplastic material suitable for oral use to form a tip, said tip being tapered throughout its length to a blunt point and having a maximum diameter substantially greater than the diameter of said dental cleaning floss, and said tip and appended dental cleaning floss capable of being directly inserted between the occlusal surfaces of adjacent teeth.

JEROME FOOTER.

REFERENCES CITED

The following references are of record in the file of this patent:

UNITED STATES PATENTS

| Number | Name | Date |
| --- | --- | --- |
| 149,034 | Gaillard | Mar. 31, 1874 |
| 1,073,946 | Kempshall | Sept. 16, 1913 |
| 1,149,376 | Leonard et al. | Aug. 10, 1915 |
| 1,465,754 | Berolzheimer | Aug. 21, 1923 |
| 1,497,991 | Schenk | June 17, 1924 |
| 1,559,320 | Hirsh | Oct. 27, 1925 |
| 1,887,270 | Krieg | Nov. 8, 1932 |
| 1,958,257 | Addis et al. | May 8, 1934 |
| 2,158,756 | Knorpp | May 16, 1939 |
| 2,470,456 | Bailar et al. | May 17, 1949 |